(12) United States Patent
Nakazawa et al.

(10) Patent No.: US 7,302,121 B2
(45) Date of Patent: Nov. 27, 2007

(54) OPTICAL DEVICE AND DRIVE VOLTAGE SUPPLY DEVICE

(75) Inventors: Tadao Nakazawa, deceased, late of Zama (JP); by Yumi Nakazawa, legal representative, Zama (JP); Hiroshi Miyata, Kawasaki (JP); Yukito Tsunoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/085,210

(22) Filed: Mar. 22, 2005

(65) Prior Publication Data

US 2006/0126988 A1    Jun. 15, 2006

(30) Foreign Application Priority Data

Dec. 10, 2004    (JP)    ............................. 2004-358349

(51) Int. Cl.
  *G02F 1/335*    (2006.01)
  *G02F 1/295*    (2006.01)
  *G02F 1/01*    (2006.01)
  *G02B 6/00*    (2006.01)

(52) U.S. Cl. ...................... 385/8; 385/1; 385/7; 385/11
(58) Field of Classification Search .................. 385/11, 385/12
  See application file for complete search history.

(56) References Cited

U.S. PATENT DOCUMENTS

| | | | | |
|---|---|---|---|---|
| 4,327,971 A | * | 5/1982 | Kondo et al. ................ | 359/250 |
| 5,133,028 A | * | 7/1992 | Okayama et al. .............. | 385/11 |
| 5,400,171 A | * | 3/1995 | Song .......................... | 359/285 |
| 6,754,403 B1 | * | 6/2004 | Schmid ........................ | 385/7 |
| 6,859,568 B2 | * | 2/2005 | Noe et al. ..................... | 385/11 |

FOREIGN PATENT DOCUMENTS

JP    4-109216    4/1992

* cited by examiner

*Primary Examiner*—Frank G. Font
*Assistant Examiner*—Charlie Peng
(74) *Attorney, Agent, or Firm*—Staas & Halsey LLP (57) ABSTRACT

The present invention is directed toward an optical device and a drive voltage supply device, which prevent occurrence of a DC drift and enable stable selection of light of desired wavelength without deteriorating a filtering characteristic. The optical device comprises a substrate having an electrooptical effect; an optical waveguide formed in this substrate; a plurality of comb electrode pairs which are arranged side by side along the optical waveguide, can apply an electric field for said electrooptical effect, and are formed from respective pairs of comb electrodes; and drive voltage supply means capable of supplying a drive voltage to said comb electrode pairs such that the voltage changes with time.

16 Claims, 12 Drawing Sheets

OUTPUT WAVEFORM OF
A.C. POWER SOURCE

PRIOR ART

FIG. 10B

PRIOR ART

FIG. 11A

PRIOR ART

FIG. 11B

PRIOR ART

FIG. 12

PRIOR ART

US 7,302,121 B2

OPTICAL DEVICE AND DRIVE VOLTAGE SUPPLY DEVICE

FIELD OF THE INVENTION

The present invention relates to an optical device and a drive voltage supply device; for instance, a technique suitable for use in a wavelength filter such as an electro-optic tunable filter (EOTF: Electro-Optic Tunable Filter) or the like.

DESCRIPTION OF THE RELATED ART

Recent development of optical communication techniques has enabled high-capacity, high-speed communication. One of the techniques that embody high-capacity, high-speed communication is wavelength division multiplexing (WDM). This technique is for simultaneously using a plurality of optical signals of different wavelengths and efficiently utilizing a transmission band of a transmission path.

In relation to a WDM communications system, there is sought a function for multiplexing/demultiplexing a plurality of wavelengths or switching a path on a per-wavelength basis between fibers which serve as transmission paths of optical signals. A fixed filter and a variable wavelength filter are available as key devices constituting this system. Particularly, a variable wavelength filter is indispensable for a system that requires switching between paths.

For this reason, application, to the optical communications system, of an electro-optic wavelength tunable filter (EOTF) which has a characteristic of high tuning speed (<1 μs) and enables variable control of a transmission wavelength of light is expected.

Figure 8:
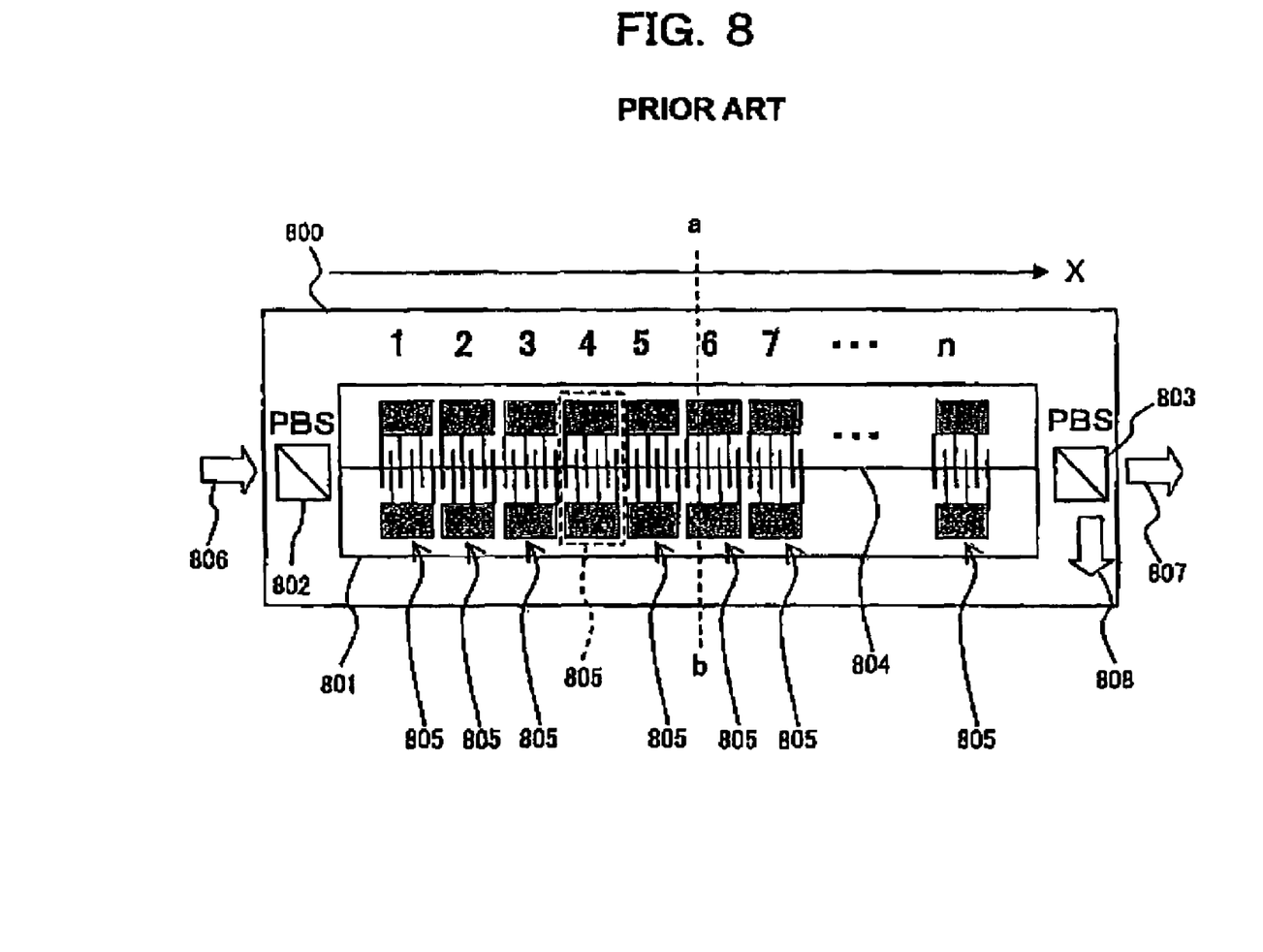
FIG. 8 is a block diagram showing the configuration of a general EOTF.

Here, FIG. 8 shows an example configuration of a common EOTF. An EOTF 800 shown in FIG. 8 comprises a substrate 801 exhibiting an electrooptical effect, such as an LN (lithium niobate) substrate or the like; a preceding-stage polarized beam splitter (PBS) 802; and a subsequent-stage polarized beam splitter (PBS) 803. The substrate 801 further comprises an optical waveguide 804; and a plurality of comb-shaped electrode pairs 805 (1 to n: "n" is an integer equal to 2 or more) arranged in line with the direction of the optical waveguide 804 (the direction of an X axis).

A plurality of comb-tooth-shaped parts (three parts in FIG. 8) are provided at uniform intervals in each comb-shaped electrode pair 805. A distance (taken as $\Lambda_0$) between comb-tooth-shaped electrode parts on one side of the electrode pair is set uniform for all of the comb-shaped electrode pairs.

Figure 12:
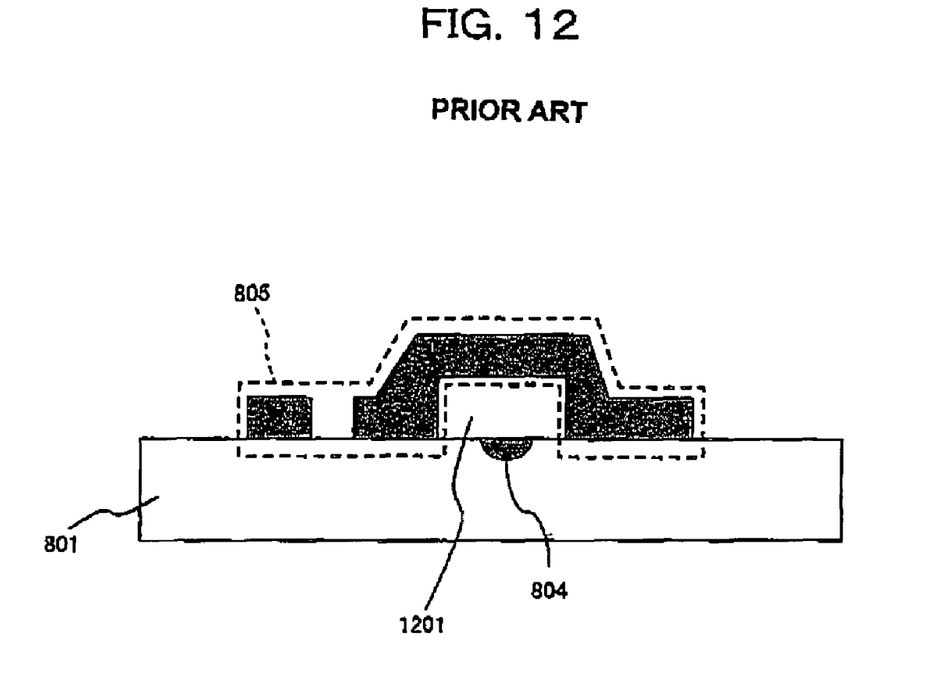
FIG. 12 is a cross-sectional view taken along line a-b shown in FIG. 8.

FIG. 12 is a cross-sectional view taken along line a-b shown in FIG. 8. As shown in FIG. 12, the optical waveguide 804 is formed on the surface layer of the substrate 801. The comb-tooth-shaped electrode parts crossing the optical waveguide 804 on the substrate 801 are provided with a buffer layer 1201 which is a dielectric substance. The buffer layer 1201 is provided for preventing the comb-tooth-shaped parts from absorbing light.

In the EOTF 800 configured in the manner mentioned above, among incident light (WDM light) 806 into which a plurality of wavelengths are wavelength-multiplexed by means of the electrooptical effect induced by the comb-shaped electrode pairs 805, light of a specific wavelength is subjected to polarizing rotation (hereinafter also called optical rotation), to thus enable selection of only the light of wavelength having undergone polarizing rotation.

Namely, the preceding-stage polarized beam splitter 802 causes only the TM-mode light or TE-mode light of the input WDM light to pass as input light for the EOTF 800. When passing through the optical waveguide 804, the input light is optically rotated by the action of the electric field generated by the voltage applied to the plurality (1 to n) of comb-shaped electrode pairs 805 provided in the optical waveguide 804. Since this optical rotation has a strong wavelength dependency, of the input light, only light of specific wavelength can be subjected to mode conversion by applying an appropriate voltage distribution to the respective comb-shaped electrode pairs 805.

Therefore, the input light including the light having finished undergoing mode conversion is split into unselected light 808 and output light (selected light) 807 by means of the subsequent-stage polarized beam splitter 803. Light of specific wavelength can be separated from a plurality of optical signals of different wavelengths by means of the foregoing operation through use of the EOTF 800.

When such an EOTF 800 is controlled (driven), fixed voltages (DC voltages) are applied to the respective comb-shaped electrode pairs 805 so as to be distributed in the form of a sinusoidal waveform in the direction of the optical waveguide 804 (direction X) to thus change the cycle (beat cycle) $\Lambda_b$, so that a selection wavelength can be changed (see, e.g., Patent Document 1 which will be described below).

Figure 9A:
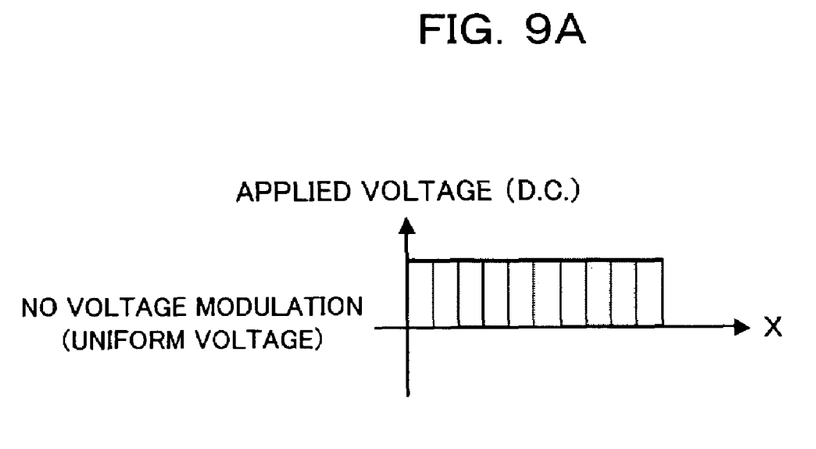
FIG. 9A is a view showing an example applied voltage (without voltage modulation) according to the conventional method for driving an EOTF.
Figure 9B:
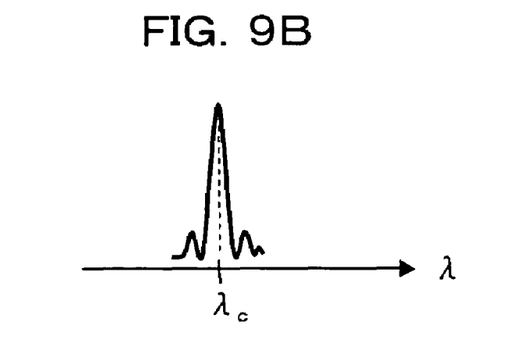
FIG. 9B is a view showing an example filtering characteristic of an EOTF attributable to the applied voltage.
Figure 10A:
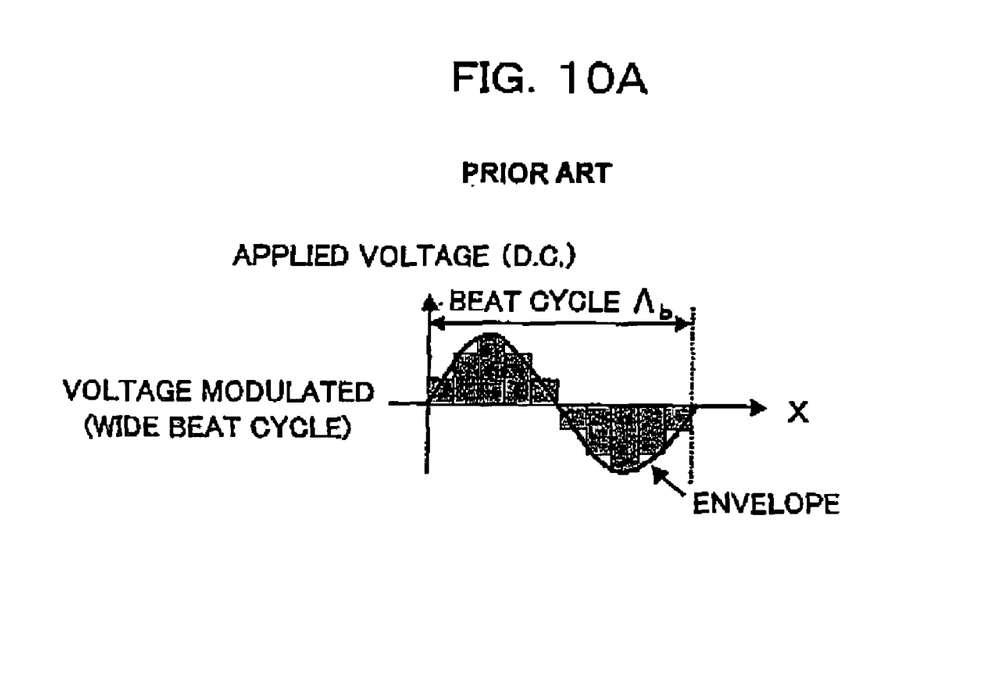
FIG. 10A is a view showing example applied voltages (with voltage modulation) according to the conventional method for driving an EOTF.
Figure 10B:
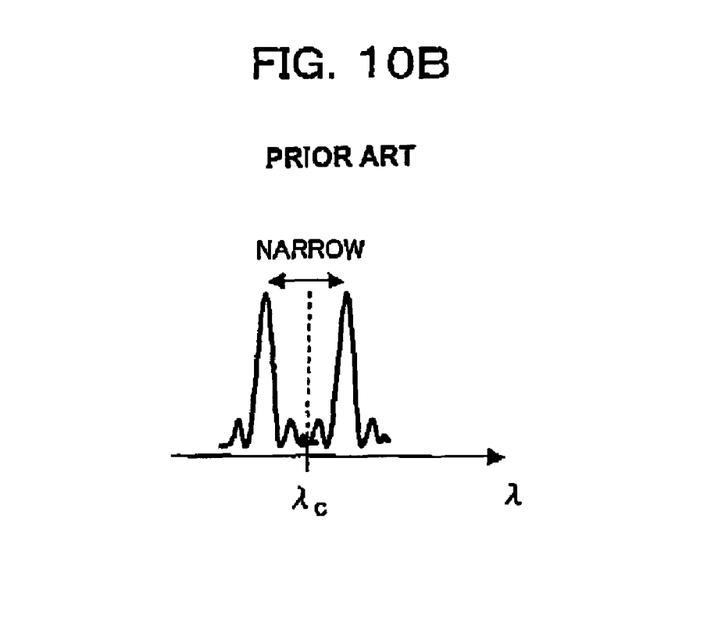
FIG. 10B is a view showing an example filtering characteristic of an EOTF attributable to the applied voltages.
Figure 11A:
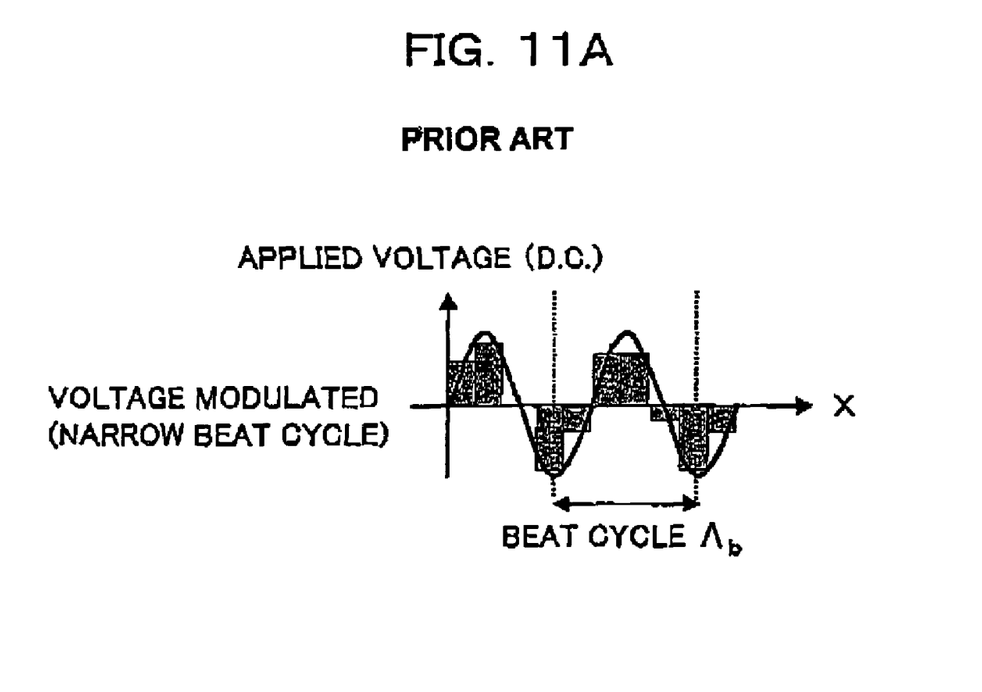
FIG. 11A is a view showing example applied voltages (with voltage modulation) according to the conventional method for driving an EOTF.
Figure 11B:
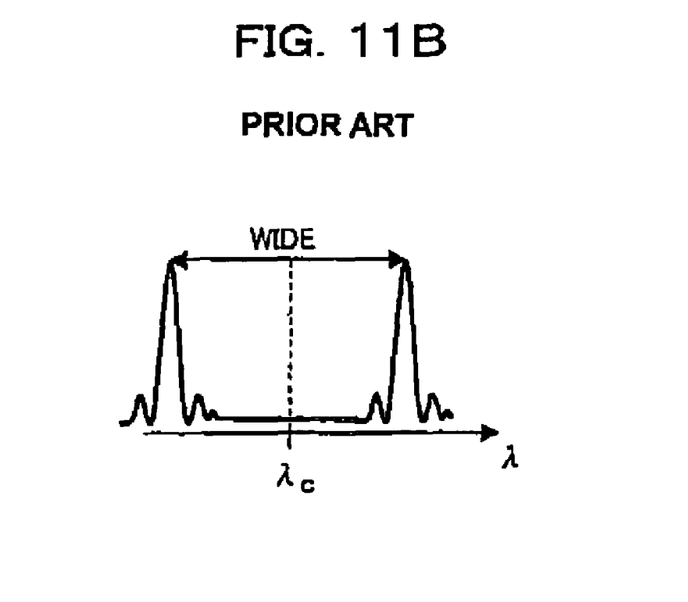
FIG. 11B is a view showing an example filtering characteristic of an EOTF attributable to the applied voltages.

For instance, FIGS. 9A, 10A and 11A show examples of applied voltages (drive voltages) employed in a conventional method for driving an EOTF, and FIGS. 9B, 10B, and 11B show a corresponding example of a filtering characteristic.

FIG. 9A shows a voltage waveform acquired when a DC voltage is applied equally to all of the comb-shaped electrode pairs 805 of the EOTF 800 without spatially modulating the voltage in the form of a sinusoidal waveform in the direction of the optical waveguide 804 (direction X), wherein the vertical axis represents a voltage value, and the horizontal axis represents positions of a plurality (1 to "n") of comb-shaped electrode pairs 805. FIG. 9B shows an example spectrum of output light 807 corresponding to the applied voltage. Given that the output light 807 acquired at this time is taken as $\lambda_c$, $\lambda_c$ satisfies $\lambda_c = \Delta n \times \Lambda_0$ ($\Delta n$: difference of refractive index of the optical waveguide between TE-mode and TM-mode, and $\Lambda_0$: a distance between comb-tooth-shaped electrode parts). Specifically, when the same DC voltage is applied to the respective comb-shaped electrode pairs 805, only light of center wavelength $\lambda_c$ can be selected as the output light 807. As will be described later by reference to FIG. 2, the distance $\Lambda_0$ between the comb-tooth-shaped parts signifies a distance between adjacent comb-tooth-shaped electrode parts 202.

FIG. 10A shows that DC voltages are applied to the respective comb-shaped electrode pairs 805 of the EOTF 800 such that the envelope of the voltage values of the comb-shaped electrode pairs 805 assumes the shape of a sinusoidal waveform [sin $(2\pi/\Lambda_b \cdot x)$] with respect to the positions (x) of the comb-shaped electrode pairs 805. FIG. 10B shows an example spectrum of the output light 807 corresponding to the applied voltage. At this time, given that the beat cycle of the sinusoidal-waveform-shaped voltage appearing in the direction of the X axis is taken as $\Lambda_b$ and the wavelength of the output light 807 is taken as $\lambda$, $\lambda$ satisfies a relationship of $\Delta n/\lambda = 1/\Lambda_0 \pm 1/\Lambda_b$. Specifically, when the DC voltages are applied to the respective comb-shaped electrode pairs 805 such that the envelope of the voltage values is distributed in the form of a sinusoidal waveform in the direction of the optical waveguide 804 (direction X), a double waveform of wavelength $\lambda$ satisfying a relationship of $\Delta n/\lambda = 1/\Lambda_0 \pm 1/\Lambda_b$ can be selected as the output light 807. The waveforms obtained by making $\Lambda_b$ infinite correspond to the cases shown in FIGS. 9A and 9B.

FIG. 11A shows a voltage waveform obtained when the beat cycle $\Lambda_b$ of a sinusoidal-waveform-shaped voltage appearing in the direction X is made shorter than that shown in FIG. 10A, by means of controlling the DC voltages applied to the respective comb-shaped electrodes pairs 805. FIG. 11B shows an example spectrum of the output light 807 corresponding to the applied voltages. Even in this case, given that the beat cycle of the envelope of the voltage value—which is distributed in the form of a sinusoidal waveform with respect to the respective comb-shaped electrode pairs 805—is taken as $\Lambda_b$ and that the wavelength of the output light 807 is taken as $\lambda$, $\lambda$ satisfies a relationship of $\Delta n/\lambda = 1/\Lambda_0 \pm 1/\Lambda_b$. In short, when the beat cycle $\Lambda_b$ of the envelope of the voltage values—which is distributed in the form of a sinusoidal waveform in the direction of the X axis—is made shorter than that shown in FIG. 10A by means of controlling the DC voltages applied to the respective comb-shaped electrode pairs 805, the wavelength interval of the selected double waveform becomes wider.

The DC voltage used for controlling the EOTF 800 is 5 to 30 V or thereabouts, and the number of electrode pairs 805 is 10 to 1000 or thereabouts.

[Patent Document 1] JP-HEI4-109216A

However, as mentioned previously, when the DC voltage is fixedly applied to the respective comb-shaped electrode pairs 805, an unbalanced concentration of ions arises in the buffer layer 1201 for reasons of a constant electric field stemming from application of the DC voltage. For instance, in FIG. 12, when a positive DC voltage is applied to a right comb-tooth-shaped electrode portion of the comb-shaped electrode pair 805 in the drawing, negative ions remain on the upper surface side of the buffer layer 1201, and positive ions remain on the lower surface side of the same. Therefore, an electric field arises in the direction opposite the electric field induced by the voltage applied to the comb-shaped electrode pair 805 within the buffer layer 1201. This induces a change in the value of the applied voltage set in advance for the comb-shaped electrode pair 805 (this phenomenon is called a DC drift), which in turn yields a problem of a failure to achieve a desired filtering characteristic.

SUMMARY OF THE INVENTION

The present invention has been conceived in view of such a problem and prevents occurrence of a DC drift and enables selection of stable light of desired wavelength without deteriorating a filtering characteristic.

To this end, an optical device of the present invention is characterized by comprising a substrate having an electrooptical effect; an optical waveguide formed in the substrate; a plurality of comb-shaped electrode pairs which are provided side by side along the optical waveguide, can apply to the optical waveguide an electric field for generating the electrooptical effect, and are formed from respective pairs of comb-shaped electrodes; and drive voltage supply means capable of supplying, to the respective comb-shaped electrode pairs, a drive voltage whose voltage changes with time.

Incidentally, the drive voltage supply means may be configured so as to have an AC voltage supply section capable of supplying an AC voltage, as the drive voltage, to the plurality of comb-shaped electrode pairs, respectively.

Moreover, each of the comb-shaped electrodes forming the comb-shaped electrode pairs may be formed from at least one comb-tooth-shaped electrode part and a root electrode part forming the root of the comb-tooth-shaped electrode part, and the comb-shaped electrode pair may be arranged such that the comb-tooth-shaped electrode parts forming the pair of comb-shaped electrodes oppose each other in a staggered configuration. The comb-shaped electrodes forming the each comb-shaped electrode pair may be formed so as to comprise the same number of comb-tooth-shaped electrode parts, respectively.

Further, the drive voltage supply means may be configured to supply, to the plurality of respective comb-shaped electrode pairs, the drive voltage whose phase is distributed in the shape of a sinusoidal wave in accordance with positions where the respective comb-shaped electrode pairs are arranged in line with a direction of the optical waveguide.

Moreover, a drive voltage supply device of the present invention is for supplying a voltage to respective electrodes for applying an electric field provided on a substrate which has an electrooptical effect, an optical waveguide, and the plurality of electrodes arranged along the optical waveguide, and the device is characterized by comprising a voltage control section for changing with time a voltage distribution applied to the plurality of electrodes.

According to the present invention, a voltage value applied to individual comb-shaped electrode pairs is changed with time, and hence unbalanced concentration of ions in the buffer layer can be averaged with time, thereby preventing occurrence of a DC drift. Therefore, there can be realized an optical device which entails few fluctuations in an effective voltage applied to the individual comb-shaped electrode pairs and which enables selection of a stable wavelength.

DESCRIPTION OF THE PREFERRED EMBODIMENT

[A] Description of an Embodiment

Figure 1:
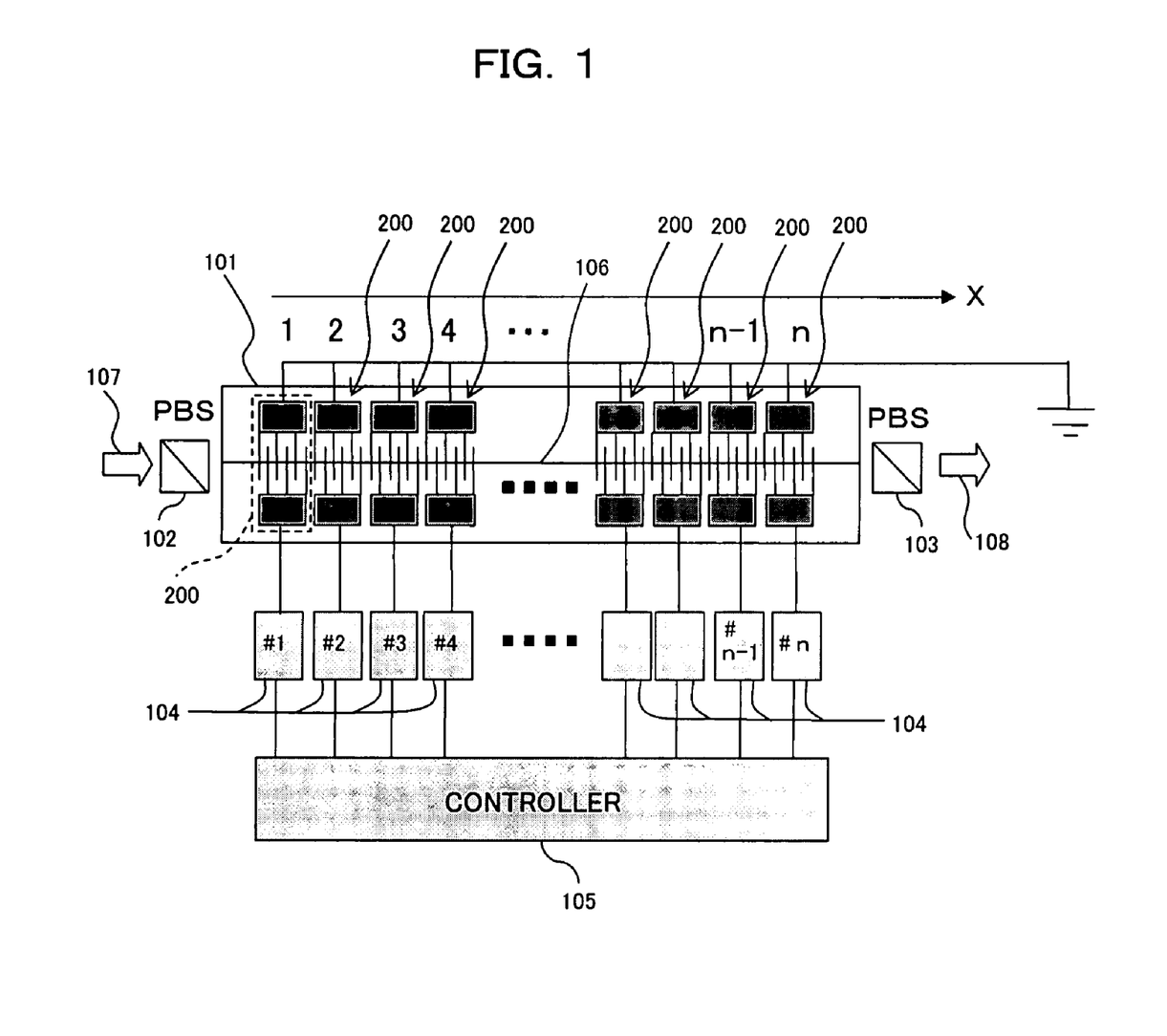
FIG. 1 is a block diagram showing the configuration of an EOTF serving as an optical device according to an embodiment of the present invention and the configuration of a drive circuit of the EOTF.

FIG. 1 is a block diagram showing the configuration of an EOTF serving as an optical device according to an embodiment of the present invention and the configuration of a drive circuit (a drive voltage supply device) of the EOTF. As shown in FIG. 1, this EOTF also comprises a substrate 101; a preceding-stage polarized beam splitter (PBS) 102; and a subsequent-stage polarized beam splitter (PBS) 103. The drive circuit comprises a plurality (#1 to #n: "n" is an integer equal to 2 or more) of AC power sources 104, and a controller 105. The substrate 101 comprises an optical waveguide 106, and a plurality (#1 to #n) of comb-shaped electrode pairs 200 arranged along the direction of the optical waveguide 106 (the direction of an X axis). Even in the embodiment, as mentioned previously by reference to FIG. 12, a comb-shaped electrode part 202 (which will be described later by reference to FIG. 2) of a comb-shaped electrode pair 200 crossing the optical waveguide 106 is provided with a buffer layer (a dielectric substance) for preventing the comb-shaped electrode part 202 from absorbing input light.

Figure 2:
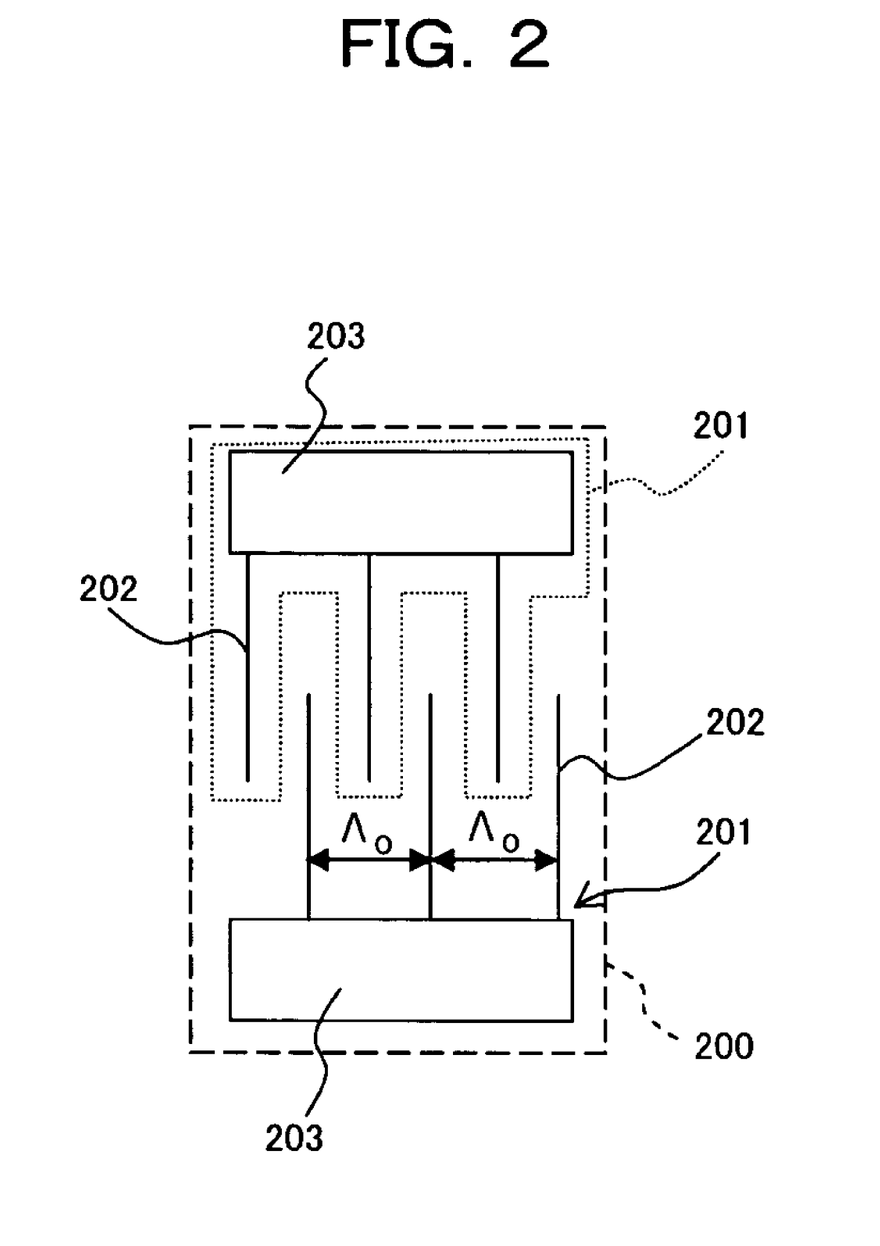
FIG. 2 is a view showing the configuration of the comb-shaped electrode pair shown in FIG. 1.

As shown in FIG. 2, each comb-shaped electrode pair 200 comprises a pair of comb-shaped electrodes 201. The comb-shaped electrode 201 comprises a plurality (three in FIG. 2) of comb-tooth-shaped electrode parts 202, and a root electrode part 203 forming the root of the comb-tooth-shaped electrode parts 202. The respective comb-tooth-shaped electrode parts 202 are arranged so as to oppose the comb-tooth-shaped electrode parts 202 of an opposing comb-shaped electrode 201 in a staggered configuration within the comb-shaped electrode pair 200. At this time, in all the comb-shaped electrodes, the distance between the comb-tooth-shaped electrode parts 202 becomes equal to $\Lambda_0$. In each comb-shaped electrode 201, the comb-tooth-shaped parts 203 are provided in the same number (three in this embodiment). The only requirement is that at least one comb-tooth-shaped electrode part 202 be provided.

In the configuration shown in FIG. 1, an AC voltage is supplied as a drive voltage to all of the comb-shaped electrode pairs 200. Meanwhile, a plurality (#1 to #n) of the AC power sources 104 are connected to the root electrode parts 203 on one side (on a lower side of the paper of FIG. 1) in a one-to-one correspondence. Further, all of the AC power sources 104 are connected to the controller 105. In contrast, all of the other root electrode parts 203 of the comb-shaped electrode pairs 200 are grounded.

The preceding-stage polarized beam splitter 102 permits transmission, as input light, of only TM-mode light (or TE-mode light) of incident light (WDM light) 107 into which a plurality of wavelengths are wavelength-multiplexed. In contrast, the subsequent-stage polarized beam splitter 103 allows only the TE-mode light (or TM-mode light) to pass as output light 108 (selected light).

The substrate 101 is an LN substrate exhibiting an electro-optical effect, or the like. When a predetermined voltage is applied to the respective comb-shaped electrode pairs 200 on the substrate 101, the refractive index of crystal is changed as a result of application of an electric field to the substrate 101. As a result, as mentioned previously, the light propagating through the waveguide 106 is subjected to optical rotating action.

Figure 3:
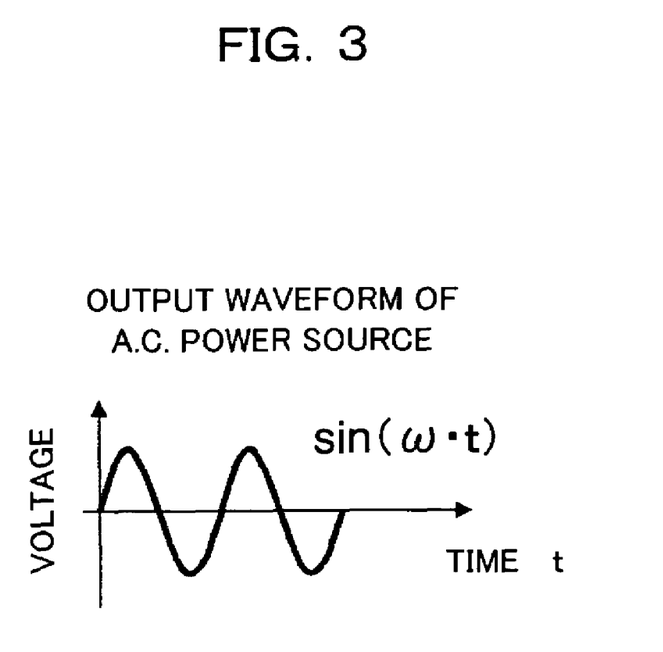
FIG. 3 is a view showing an example AC voltage waveform of an AC power source shown in FIG. 1.

The respective AC power sources (AC signal sources) 104 are for supplying an AC voltage as a drive voltage to the comb-shaped electrode pairs 200. Provided that the frequency of the voltage is taken as $\omega$, the waveform of the AC voltage is represented as, e.g., $\sin(\omega \cdot t)$, as shown in FIG. 3. At this time, $\omega$ is set to, e.g., 0.1 to 10 kHz or thereabouts. Specifically, the AC power sources 104 constitute an AC voltage supply section capable of supplying an AC voltage as a drive voltage to the respective comb-shaped electrode pairs 200.

The controller (an a.c.AC signal source control section) 105 is for controlling the AC voltage supplied from the respective AC power sources 104 to the comb-shaped electrode pairs 200. In the embodiment, the phase of each AC power source 104 is controlled by the value of the voltage applied to the respective comb-shaped electrode pairs 200 such that the beat cycle $\Lambda_b$ forms a constant voltage distribution of sinusoidal waveform shape (see, e.g., FIGS. 4A and 4B) in the direction of the X axis.

The respective AC power sources 104 and the controller 105 constitute drive voltage supply means capable of supplying, to the comb-shaped electrode pairs 200, a drive voltage whose value changes with time. Particularly, the controller 105 operates as a voltage control section which changes the distribution of the voltage applied to the plurality of comb-shaped electrode pairs 200 with time. Accordingly, the controller can supply to the respective comb-shaped electrode pairs 200 a drive voltage having a phase distribution of sinusoidal waveform shape, in accordance with the positions of the electrode pairs 200 situated along the direction of the optical waveguide 106 (the direction of the X axis).

So long as the AC voltage waveforms of the respective AC power sources 104 are set to the sinusoidal waveform having a single amplitude and frequency, the only requirement for the controller 105 is to control only the phase of the AC voltage. Hence, the configuration of the controller 105 can be simplified. Even when the voltage waveforms of some or all of the AC power sources 104 are different, a voltage of desired value can be applied to the respective comb-shaped electrode pairs 200 irrespective of the voltage waveform of the respective AC power sources 104, by means of phase control of the controller 105.

A method for driving the EOTF of the present embodiment having the foregoing configuration will be described in detail hereunder.

In FIG. 1, when the incident light (WDM light) 107 into which a plurality of wavelengths are wavelength-multiplexed is input to the preceding-stage polarized beam splitter 102, only the TM-mode light (or the TE-mode light) is allowed to pass and enter the optical waveguide 106 formed on the substrate 101. At this time, the AC voltage is applied to the respective comb-shaped electrode pairs 200 from the respective AC power sources 104 connected to the respective comb-shaped electrode pairs 200 in a one-to-one correspondence, and the input light is subjected to optical rotation by means of the electrooptical effect of the substrate 101. The optical rotation exhibits a strong wavelength dependency. Of the input light, only light of specific wavelength can be converted into a TE mode (or TM mode) by applying an appropriate voltage to the respective comb-shaped electrode pairs 200.

Figure 4A:
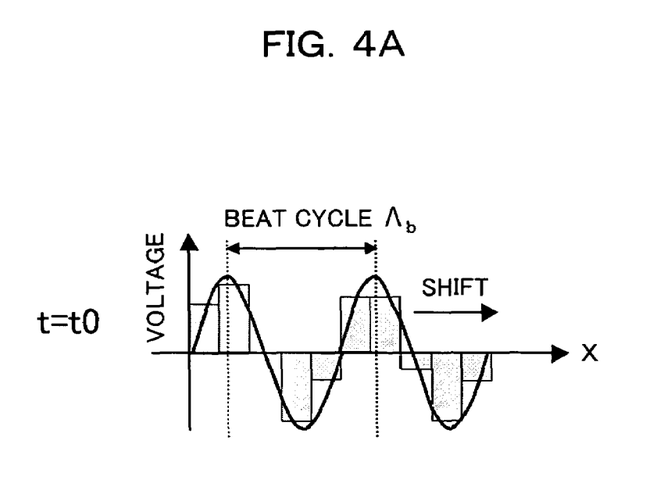
FIGS. 4A and 4B are views showing a time-varying change in drive voltages applied to the respective comb-shaped electrode pairs shown in FIG. 1.
Figure 4B:
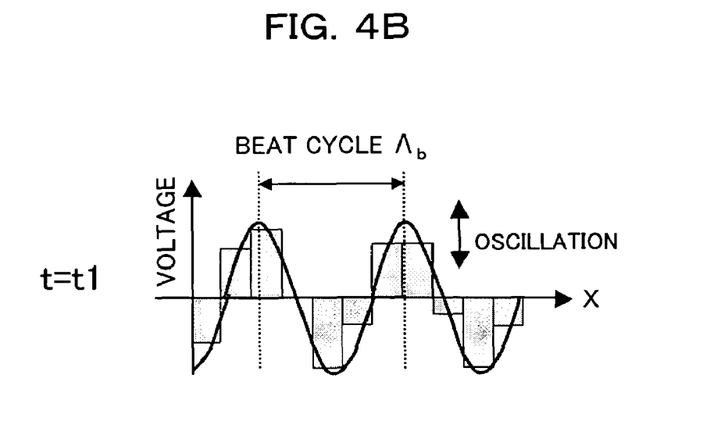

For instance, as shown in FIG. 4A, at time t=t0 the controller 105 controls the phase of the AC voltage of the individual AC power sources 104 such that the envelope of the AC voltages applied to the respective comb-shaped electrode pairs 200 forms a voltage distribution of sinusoidal waveform shape with a constant beat cycle $\Lambda_b$ in the direction of the X axis, and the AC voltage is applied to the respective comb-shaped electrode pairs 200. As a result, the light of wavelength $\lambda$ satisfying a relationship of $\Delta n/\lambda = 1/\Lambda_0 \pm 1/\Lambda_b$ ($\Lambda_0$: a distance between comb-tooth-shaped parts) is subjected to optical rotation. As shown in, e.g., FIG. 4C, light of double wave (wavelengths $\lambda 1, \lambda 2$) satisfying the foregoing relationship is selected as the output light 108.

The optically-rotated light is converted from the TM mode (or the TE mode) into the TE mode (or the TM mode). The TE-mode (or the TM-mode) light is output as the output light 108 by way of the subsequent-stage polarized beam splitter 103.

Figure 4C:
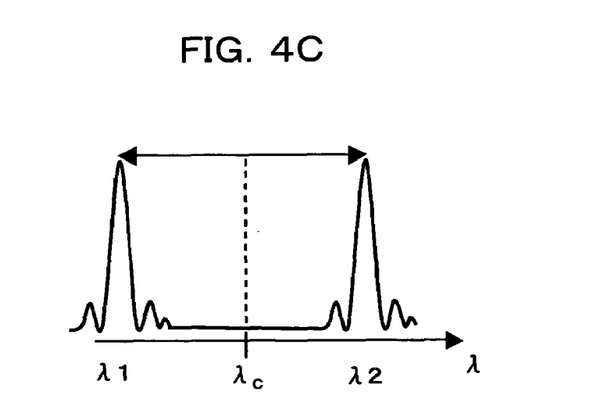
FIG. 4C is a view showing an example spectrum of a wavelength whose passage is allowed by the drive voltage.

Subsequently, the voltage applied to the individual comb-shaped electrode pairs 200 is an AC voltage. Hence, the voltage changes with elapse of time while maintaining a phase relationship determined by the phase setting of the controller 105. Specifically, as shown in, e.g., FIG. 4B, at time t=t1 (t1>t0), the AC voltage applied to the respective comb-shaped electrode pairs 200 changes with time while the beat cycle $\Lambda_b$ maintains the constant voltage distribution of sinusoidal waveform shape in the direction of the X axis. At this time, the beat cycle $\Lambda_b$ remains unchanged, and hence the wavelength selected for the output light 108 also remains unchanged (the double wave of wavelengths $\lambda 1, \lambda 2$ as shown in FIG. 4C). Therefore, the unbalanced concentration of ions in the buffer layer can be averaged with time. Thus, occurrence of a DC drive in the buffer layer, which is a challenge to be met, can be prevented, and the light of desired wavelengths ($\lambda 1, \lambda 2$) can be selected.

Figure 5A:
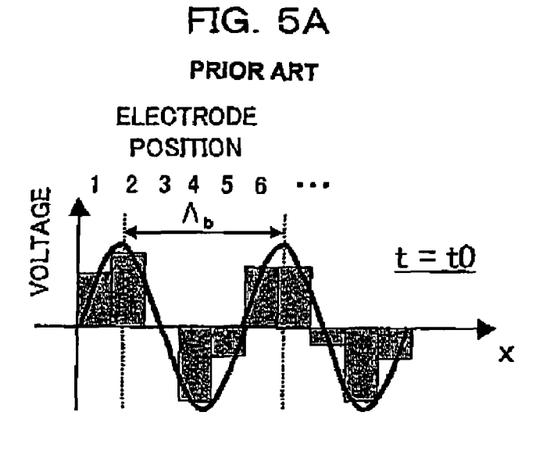
FIGS. 5A, 5B, and 5C are views showing time-varying changes in the voltages applied to the respective comb-shaped electrode pairs according to a conventional drive method in comparison with a method for driving an EOTF according to the embodiment.
Figure 5B:
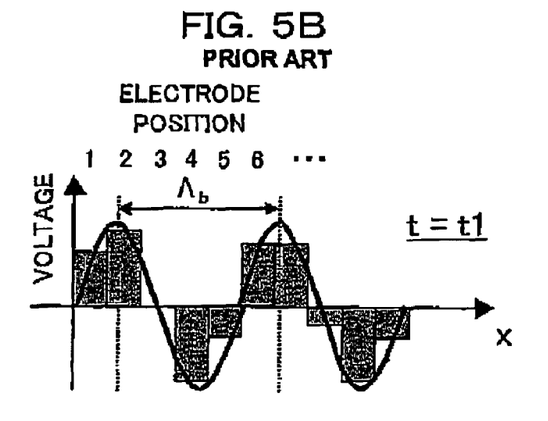
Figure 5C:
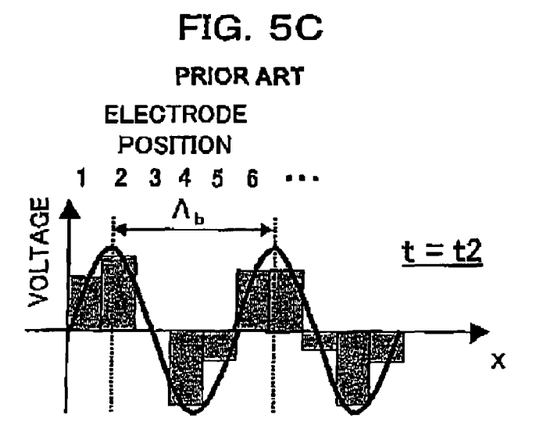
Figure 6A:
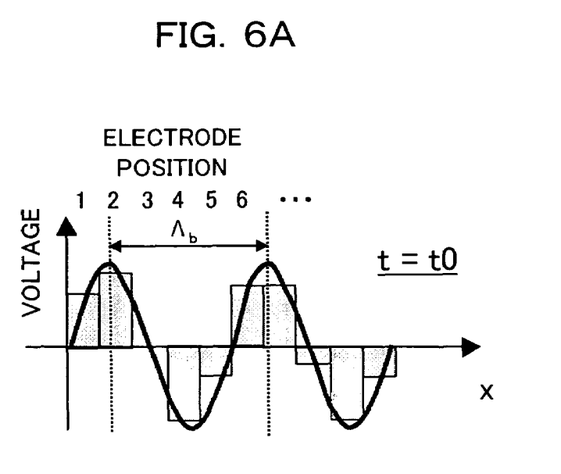
FIGS. 6A, 6B and 6C are views showing time-varying changes in the voltages applied to the respective comb-shaped electrode pairs under the method for driving an EOTF according to the embodiment.
Figure 6B:
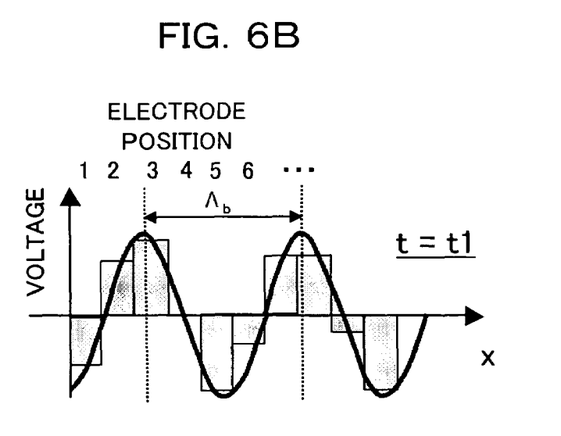
Figure 6C:
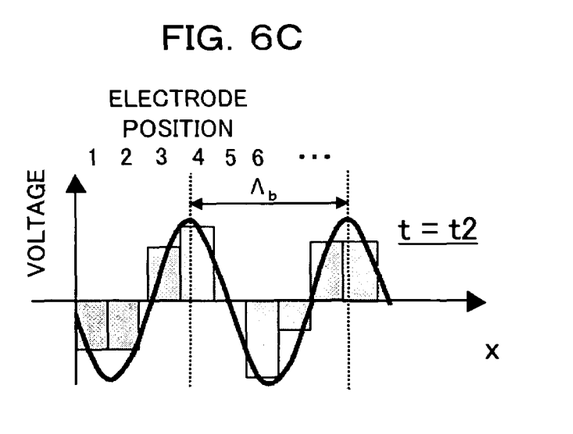

In order to clarify a difference between the related art and the present invention, FIGS. 5A, 5B, and 5C show time-varying changes in the voltages (DC voltages) applied to the respective comb-shaped electrode pairs 200 under a conventional drive method, and FIGS. 6A, 6B and 6C show time-varying changes in the voltage (AC voltage) applied to the respective comb-shaped electrode pairs 200 according to the embodiment.

As shown in FIGS. 5A, 5B, and 5C, under the conventional drive method, the voltages applied to the respective comb-shaped electrode pairs 200 are DC voltages. Hence, the envelope of the voltage values of the respective comb-shaped electrode pairs 200 (a voltage distribution with respect to the direction of the X axis) is expressed by sin $(2\pi/\Lambda_b \cdot x)$. The voltages applied to the respective comb-shaped electrode pairs 200 remain unchanged with time (the voltages do not change between times "t"=t0, t1, t2 (where t0<t1<t2). Therefore, as described by reference to FIG. 12, a constant electric field arises in the buffer layer, which in turn induces a DC drift.

In contrast, under the drive method of the present embodiment, as shown in FIGS. 6A, 6B, and 6C, the voltage (AC voltage) applied to the respective comb-shaped electrode pairs 200 changes with time while the beat cycle $\Lambda_b$ of the envelope (voltage distribution) of voltage values with respect to the direction of the X axis is maintained constant. At this time, the envelope (the voltage distribution with respect to the direction of the X axis) of the voltage values of the respective comb-shaped electrode pairs 200 is expressed by sin $(2\pi/\Lambda_b \cdot x + \omega \cdot t)$.

Accordingly, the electric field applied to the buffer layer of the respective comb-shaped electrode pairs 200 also changes with time, whereby the unbalanced concentration of ions in the buffer layer is averaged with time, thereby preventing occurrence of a DC drift.

Consequently, light of desired wavelength can be selected without deteriorating the filtering characteristic of the wavelength filter.

Variable control of a selection wavelength as the function of the EOTF is indispensable. However, in the present embodiment, as mentioned previously, $\lambda$ satisfies a relationship of $\Delta n/\lambda = 1/\Lambda_0 \pm 1/\Lambda_b$ as a method for controlling a selection wavelength. Therefore, changing of the beat cycle $\Lambda_b$ is conceivable.

Figure 7A:
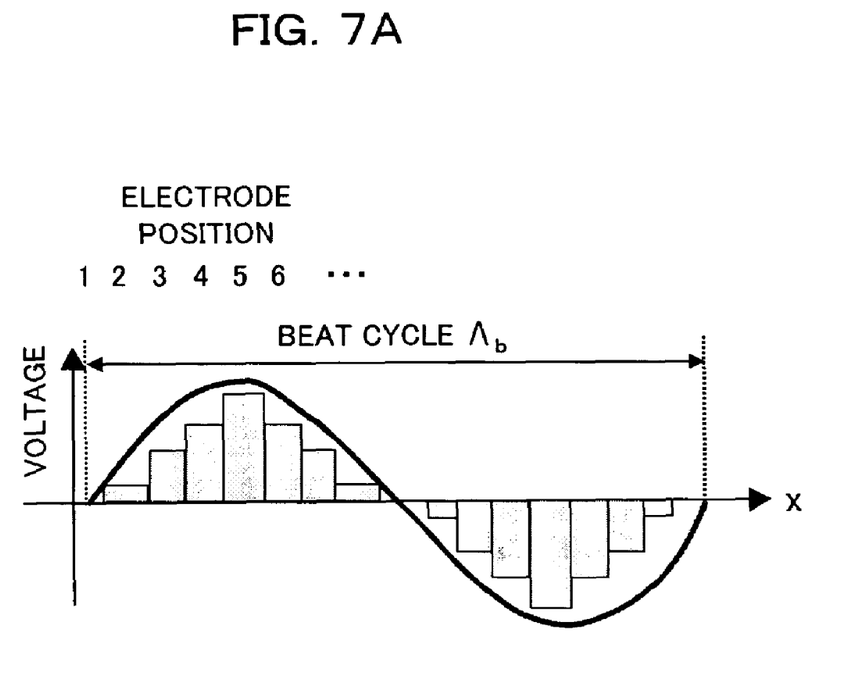
FIGS. 7A and 7B are views for describing that a change arises in a beat cycle for reasons of selective wavelength control according to the embodiment.
Figure 7B:
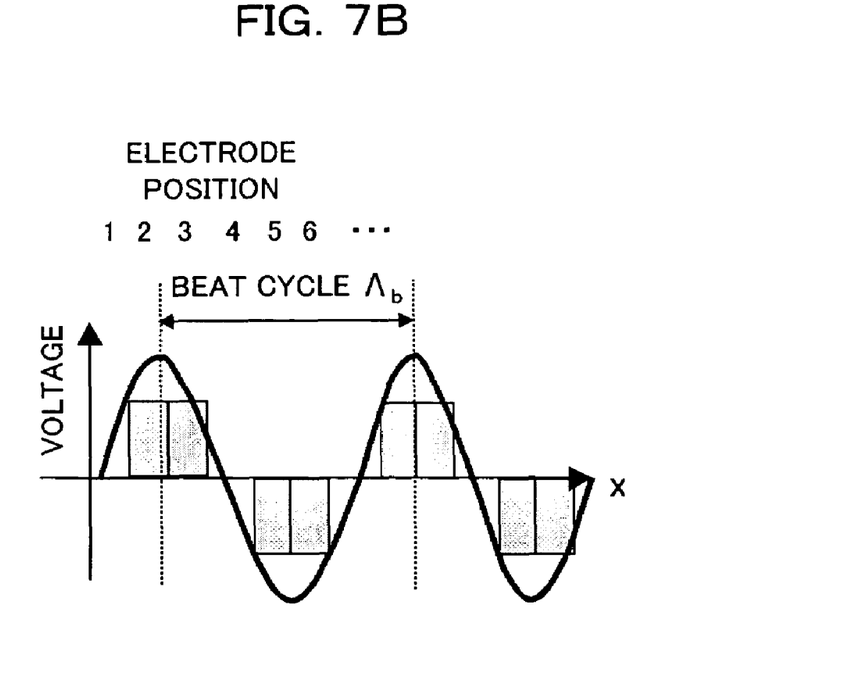

As shown in, e.g., FIGS. 7A and 7B, the AC voltage applied to the respective comb-shaped electrode pairs 200 is embodied by appropriately performing phase control with the controller 105. Specifically, the cycle of the sinusoidal waveform is changed by the controller 105 in accordance with the light of wavelength to be selected. For instance, the beat cycle $\Lambda_b$ can be changed from a case where a phase difference between the AC voltages applied to the respective comb-shaped electrode pairs 200 is set to $\pi/8$ by the controller 105 as shown in FIG. 7A to a case where the phase difference is set to $\pi/3$ as shown in FIG. 7B. Thereby, the selection wavelength can be changed while preventing occurrence of a DC drift. For instance, when the beat cycle $\Lambda_b$ is set to be short, the interval between the wavelengths of the double wave to be selected can be broadened. Conversely, when the beat cycle $\Lambda_b$ is set to be long, the interval between the wavelengths of the double wave to be selected can be narrowed.

The present invention is not limited to the foregoing embodiment and can be carried out while being modified in various manners within the scope of the gist of the invention.

For instance, it may be the case that the controller 105 is not common to all of the comb-shaped electrode pairs 200. The comb-shaped electrode pairs 200 may be grouped into several groups, and a common AC power source provided for each of the groups.

In the previously-described embodiment, the AC power sources 104 are provided for the respective comb-shaped electrode pairs 200, and the phase of the AC power sources 104 is controlled by the common controller 105. However, in FIG. 1, the respective AC power sources 104 may be replaced with phase controllers, and the controller 105 may be replaced with a single AC power source. The AC voltages supplied from the common AC power sources to the respective comb-shaped electrodes 200 may be subjected to phase control by the respective phase controllers such that phase distribution of sinusoidal waveform shape analogous to that mentioned previously is assumed. Even in this case, the working-effect analogous to that described in connection with the previously-described embodiment can be expected.

In this case, the AC voltage is supplied from the common AC power source to the respective comb-shaped electrode pairs 200. Hence, an AC voltage of single amplitude and frequency can be readily applied to the respective comb-shaped electrode pairs 200. Accordingly, the AC voltage can be subjected solely to phase control by means of the phase controller connected to the respective comb-shaped electrode pairs 200, whereby the drive voltage equivalent to that described in connection with the previously-described embodiment can be obtained.

Further, it may be the case that the AC power source is not common to all of the comb-shaped electrode pairs 200. The comb-shaped electrode pairs 200 may be grouped into several groups, and a common AC power source may be provided for each of the groups.

Moreover, in the previously-described embodiment, the AC power source having a voltage waveform such as that shown in FIG. 3 is used. However, any signal source can be applied in the same manner, so long as the signal source can output a voltage waveform whose voltage value applied to the comb-shaped electrode pair 200 changes with time. The working-effect analogous to that described in connection with the previously-described embodiment can be yielded.

The previously-described embodiment (optical device) can also be applied to an optical device having a known polarization diversity configuration. The polarization diversity configuration is achieved when the device is arranged to yield the same characteristic to both TE-polarized light and TM-polarized light.

Furthermore, a tunable laser can also be constituted by connecting the EOTF of the previously-described embodiment to a semiconductor optical amplifier (SOA).

What is claimed is:

1. An optical device comprising:
    a substrate having an electrooptical effect;
    an optical waveguide formed in said substrate propagating an input light having a plurality of wavelengths which are wavelength-multiplexed;
    a plurality of comb-shaped electrode pairs which are provided side by side along said optical waveguide, can apply to said optical waveguide an electric field generating the electrooptical effect, and are formed from respective pairs of comb-shaped electrodes; and
    a drive voltage supply supplying to said respective comb-shaped electrode pairs, a drive voltage whose voltage changes with time,
    wherein
    a waveform distributed by the drive voltage, which is supplied to said respective comb-shaped electrode pairs, is shifting to the direction of the optical waveguide to thereby select a respective wavelength of the input light in accordance with the drive voltage.

2. The optical device according to claim 1, wherein said drive voltage supply has an AC voltage supply section capable of supplying an AC voltage, as said drive voltage, to said plurality of comb-shaped electrode pairs, respectively.

3. The optical device according to claim 1, wherein each of said comb-shaped electrodes forming said comb-shaped electrode pairs is formed from at least one comb-tooth-shaped electrode part and a root electrode part forming the root of said comb-tooth-shaped electrode part, and said comb-shaped electrode pair is arranged such that said comb-tooth-shaped electrode parts forming said pair of comb-shaped electrodes oppose each other in a staggered configuration.

4. The optical device according to claim 2, wherein each of said comb-shaped electrodes forming said comb-shaped electrode pairs is formed from at least one comb-tooth-shaped electrode part and a root electrode part forming the root of said comb-tooth-shaped electrode part, and said comb-shaped electrode pair is arranged such that said comb-tooth-shaped electrode parts forming said pair of comb-shaped electrodes oppose each other in a staggered configuration.

5. The optical device according to claim 3, wherein said comb-shaped electrodes forming said each comb-shaped electrode pair are formed so as to comprise the same number of comb-tooth-shaped electrode parts, respectively.

6. The optical device according to claim 4, wherein said comb-shaped electrodes forming said each comb-shaped electrode pair are formed so as to comprise the same number of comb-tooth-shaped electrode parts, respectively.

7. The optical device according to claim 1, wherein said drive voltage supply is configured to supply, to said plurality of respective comb-shaped electrode pairs, said drive voltage whose phase is distributed in the shape of a sinusoidal wave in accordance with positions where said respective comb-shaped electrode pairs are arranged in line with a direction of said optical waveguide.

8. The optical device according to claim 7, wherein said drive voltage supply is configured to change said drive voltage with time while maintaining the cycle of said sinusoidal wave.

9. The optical device according to claim 8, wherein said drive voltage supply is configured to vary the cycle of said sinusoidal wave.

10. The optical device according to claim 7, wherein said drive voltage supply has
    a plurality of AC signal sources capable of generating AC voltages as said drive voltages to be supplied to said plurality of respective comb-shaped electrode pairs; and
    an AC signal source control section which controls said plurality of AC signal sources in order to generate AC voltages of phases to be supplied to said respective comb-shaped electrode pairs in accordance with positions where said comb-shaped electrode pairs are arranged in line with a direction of said optical waveguide.

11. The optical device according to claim 8, wherein said drive voltage supply has
    a plurality of AC signal sources capable of generating AC voltages as said drive voltages to be supplied to said plurality of respective comb-shaped electrode pairs; and
    an AC signal source control section which controls said plurality of AC signal sources in order to generate AC voltages of phases to be supplied to said respective comb-shaped electrode pairs in accordance with positions where said comb-shaped electrode pairs are arranged in line with a direction of said optical waveguide.

12. The optical device according to claim 9, wherein said drive voltage supply has
    a plurality of AC signal sources capable of generating AC voltages as said drive voltages to be supplied to said plurality of respective comb-shaped electrode pairs; and
    an AC signal source control section which controls said plurality of AC signal sources in order to generate AC voltages of phases to be supplied to said respective comb-shaped electrode pairs in accordance with positions where said comb-shaped electrode pairs are arranged in line with a direction of said optical waveguide.

13. The optical device according to claim 7, wherein said drive voltage supply has
    an AC signal source; and a plurality of phase control sections which are provided in correspondence to said plurality of comb-shaped electrode pairs and can control the phase of an AC signal output from said AC signal source in accordance with positions where said respective comb-shaped electrode pairs are arranged in line with a direction of said optical waveguide.

14. The optical device according to claim 8, wherein said drive voltage supply has an AC signal source; and a plurality of phase control sections which are provided in correspondence to said plurality of comb-shaped electrode pairs and can control the phase of an AC signal output from said AC signal source in accordance with positions where said respective comb-shaped electrode pairs are arranged in line with a direction of said optical waveguide.

15. The optical device according to claim 9, wherein said drive voltage supply has an AC signal source; and a plurality of phase control sections which are provided in correspondence to said plurality of comb-shaped electrode pairs and can control the phase of an AC signal output from said AC signal source in accordance with positions where said respective comb-shaped electrode pairs are arranged in line with a direction of said optical waveguide.

16. An optical device comprising:

a plurality of comb-shaped interleaved electrode pairs along an optical waveguide which propagates an input light having a plurality of wavelengths which are wavelength-multiplexed; and a drive voltage supply supplying to each of said plurality of comb-shaped electrode pairs a drive voltage whose voltage changes with time, wherein a sinusoidal waveform distributed by the drive voltage is shifting to the direction of the optical waveguide to thereby select a respective wavelength of the input light in accordance with the drive voltage, and the selected wavelength is output from the device.

\* \* \* \* \*